US007066108B2

(12) United States Patent
Andersson et al.

(10) Patent No.: US 7,066,108 B2
(45) Date of Patent: *Jun. 27, 2006

(54) DEVICE FOR CARRYING A MILKING MEMBER, AND METHOD FOR CARRYING A MILKING MEMBER

(75) Inventors: Kennet Andersson, Kolbäck (SE); Viktor Lindroth, Stockholm (SE)

(73) Assignee: DeLaval Holding AB, Tumba (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/477,559

(22) PCT Filed: May 8, 2002

(86) PCT No.: PCT/SE02/00892

§ 371 (c)(1),
(2), (4) Date: Apr. 13, 2004

(87) PCT Pub. No.: WO02/089562

PCT Pub. Date: Nov. 14, 2002

(65) Prior Publication Data

US 2004/0200421 A1    Oct. 14, 2004

(30) Foreign Application Priority Data

May 10, 2001    (SE)    .................................... 0101648

(51) Int. Cl.
*A01J 5/00*    (2006.01)
(52) U.S. Cl. ................. 119/14.1; 119/14.08; 119/14.13
(58) Field of Classification Search ............... 119/14.1, 119/14.11, 14.13, 14.01, 14.45
See application file for complete search history.

(56) References Cited

U.S. PATENT DOCUMENTS

| 2,812,742 A | * | 11/1957 | Millar ........................ 119/14.1 |
| 3,789,798 A | | 2/1974 | Reisgies et al. .......... 119/14.08 |
| 3,938,470 A | | 2/1976 | Pace .......................... 119/14.1 |

(Continued)

FOREIGN PATENT DOCUMENTS

DE    2028460    6/1970

(Continued)

OTHER PUBLICATIONS

IBM Bulletin, Research Disclosure, Oct. 1998/1347, pp. 41442-41443 "A Service Arm for Carrying a Milking Member of a Milking Machine" (Disclosed Anonymously).

*Primary Examiner*—Teri Pham Luu
*Assistant Examiner*—Kimberly S. Smith
(74) *Attorney, Agent, or Firm*—Hovey Williams LLP (57) ABSTRACT

The invention refers to a device and a method for carrying a milking member (1), which includes at least one teacup (3) and which is connected to a milking machine (5) via a flexible conduit member (6). A support element (10) is fixedly mounted in or at a milking box (13) arranged to receive an animal to be milked. An arm arrangement (9) is pivotably connected to the support element and arranged to support the milking member at least in connection with the application of the teacup to a teat of the animal. The arm arrangement is movable from a first position, in which the milking member is located beside the animal, to a second position, in which the milking member is located below the animal. The device includes a first part arranged to lock the milking member in relation to the arm arrangement in order to facilitate the application of the teacup to the teat.

22 Claims, 7 Drawing Sheets

U.S. PATENT DOCUMENTS

| | | | | |
|---|---|---|---|---|
| 4,333,421 A | | 6/1982 | Schluckboer | 119/14.08 |
| 5,069,160 A | * | 12/1991 | Street et al. | 119/14.08 |
| 5,379,722 A | * | 1/1995 | Larson | 119/14.1 |
| 5,967,081 A | * | 10/1999 | Street et al. | 119/14.08 |
| 6,009,833 A | * | 1/2000 | van der Lely | 119/14.02 |
| 6,289,845 B1 | * | 9/2001 | Andersson | 119/14.1 |
| 6,382,130 B1 | * | 5/2002 | Rooney | 119/14.04 |

FOREIGN PATENT DOCUMENTS

| | | |
|---|---|---|
| DE | 2153047 | 10/1971 |
| EP | 630556 | 5/1994 |
| GB | 1153128 | 6/1966 |
| GB | 1253766 | 2/1970 |
| SE | 323240 | 8/1966 |
| SE | 365930 | 4/1972 |

\* cited by examiner

Fig. III

DEVICE FOR CARRYING A MILKING MEMBER, AND METHOD FOR CARRYING A MILKING MEMBER

THE BACKGROUND OF THE INVENTION AND PRIOR ART

The present invention refers to a device for carrying a milking member, which includes at least a teacup and which, via a flexible conduit member, is connectable to a milking machine arranged to provide a relatively low pressure, wherein the device includes a support element, which is fixedly mounted to or at a milking box arranged to receive an animal to be milked, and an arm arrangement, which is pivotably connected to the support element and arranged to support the milking member at least in connection with the application of said teacup to a teat of said animal, wherein the arm arrangement is moveable from a first position in which the milking member is located beside said animal, to a second position, in which the milking member is located below said animal. The invention also refers to a method for carrying a milking member, which includes at least one teacup and which is connectable to a milking machine via a flexible conduit member, by means of a device, which includes a support element, which is fixedly mounted to or at a milking box arranged to receive an animal to be milked, and an arm arrangement, which is pivotably connected to the support element and arranged to support the milking member at least in connection with the application of said teacup to a teat of said animal.

A plurality of various such devices and methods for carrying a milking member are known in the patent literature. Such carrying devices, which often are named services arms, are in typical cases in connection with manual application of teatcups intended to carry the milking member when the milking member is moved from a position beside the animal to be milked to a position below the animal.

The milking member is released from the service arm by the milker holding the milking member with his one hand and applying the teatcups with his other hand. During the milking proper, the milking member is hanging freely below the udder. The milking member normally includes a so called claw. The claw is connected to the teatcups via a respective short milk conduit and arranged to collect the milk from the different teats and convey it in a common long milk conduit to a milk collecting member. With its present design, the claw is however relatively heavy to handle for the milker. In addition, there is a risk that the teatcups will come into contact with the ground when the milking is finished and the teatcups are removed from the teats.

U.S. Pat. No. 4,333,421 discloses a device for carrying a claw with four teatcups. The claw is via a flexible conduit member connected to a milking machine, which is arranged to provide a relatively low pressure. The device includes a support element, which is fixedly mounted in or at a milking box arranged to receive an animal to be milked, and an arm arrangement, which is pivotably connected to the support element and arranged to support the milking member at least in connection with the application of said teacup to a teat of said animal. The arm arrangement is moveable from a first position, in which the milking member is located beside said animal, to a second position, in which the milking member is located below said animal. However, the known arm arrangement offers no support for the claw when the milker is going to apply the teatcups to teats.

SUMMARY OF THE INVENTION

The object of the present invention is to facilitate the application of the teatcups to the teats of the animal to be milked.

This object is obtained by the device initially defined, which is characterised in that it includes means, arranged to permit locking of the milking member in relation to the arm arrangement in order to facilitate the application of said teacup to said teat.

Thanks to the proposed locking of the arm arrangement and the milking member, a fixation of the milking member in the second position below the udder of the animal is obtained so that manual application of one or several teatcups is simplified. In such a way, the milker does not need to hold the milking member or the claw when the teatcups are to be applied, and it is possible for the milker to use both hands for the application of the teatcups. The milker may thus apply the teatcups substantially simultaneously two and two.

According to an embodiment of the invention, the arm arrangement includes means, which are arranged to permit locking of the arm arrangement in relation to the support element in the second position. In such a way a substantially absolute fixation of the milking member and the whole arm arrangement is obtained when the teatcups are going to be applied.

According to a further embodiment of the invention, the device includes means arranged to permit releasing of the locking of the arm arrangement after the application of said teacup. By means of such a releasing it is possible to let the milking member and the arm arrangement follow the movements of the animal during the milking. Advantageously, the device includes a balancing member, which is arranged to balance the weight of the arm arrangement and the conduit member. In such a way, merely the weight of the milking member and the teatcups will act on the teats during the milking. Furthermore, the device may advantageously include means arranged to permit releasing of the locking of the milking member in relation to the arm arrangement after the application of said teacup, wherein the milking member is partly moveable in relation to the arm arrangement. Such a part-movability may be obtained by the milking member being connected to the arm arrangement via the flexible conduit member that is fixedly connected to the arm arrangement.

According to a further embodiment of the invention, said means, at least when the movement of the arm arrangement from the first position to the second position is initiated, are arranged to permit locking of the milking member in relation to the arm arrangement. In such a way the milker may move the arm arrangement and the milking member to the second position by gripping merely the milking member or two teatcups and move them to the correct position.

According to a further embodiment of the invention, the arm arrangement includes an arm element, which is fixedly connected to the conduit member in the proximity of the milking member. Advantageously, the arm element may include a telescope arm with at least a first part and a second part, which is displaceable in relation to the first part and which is fixedly connected to the conduit member in the proximity of the milking member. Such a telescope arm may in an easy manner be pulled out to a desired length so that the teatcups reach the respective teat. A telescope arm may also be moved together in such a way that it takes up a small space, and it may easily be turned away for enabling other activities, such as cleaning of the udder etc.

According to a further embodiment of the invention, said means includes a first locking member, which includes a first locking part fixedly connected to the milking member and a second locking part displaceably provided on the projectable second part of the telescope arm between a locking position, in which the second locking part is in engagement with the first locking part and locks the milking member in relation to the arm arrangement, and a releasing position, in which the second locking part is not in engagement with the first locking part, wherein the milking member is partly moveable in relation to the arm arrangement. By means of such a locking member, releasing of the milking member may be obtained by a simple manual grip by the milker after the application of the teatcups by pulling the second locking part somewhat rearwardly in the direction away from the milking member.

According to a further embodiment of the invention, said means includes a second locking member, which is arranged to permit the projecting of the second part during the movement of the arm arrangement from the first position to the second position and to lock the second part in relation to the first part in an opposite movement direction. The milker may thus pull the arm arrangement and the milking member forwardly to the desired second position and when this position has been reached, lock the arm arrangement so that it may not be pulled back.

According to a further embodiment of the invention, the arm element is tubular, wherein the conduit member extends through the arm element.

According to a further embodiment of the invention, the arm arrangement includes a rotary member, which is connected to the arm element and arranged to permit rotation of the arm element in a first rotary direction about a rotary axis of the rotary member during the movement of the arm arrangement from the first position to the second position.

According to a further embodiment of the invention, said means includes a third locking member, which is comprised by the rotary member and arranged to provide said locking of the arm element in a rotary position obtained through a rotation of the arm element in a second rotary direction which is opposite to the first rotary direction.

According to a further embodiment of the invention, the arm arrangement includes a swing arm, which is swingably connected to the support element by means of a swing joint, wherein the arm element is rotatably connected to the swing arm. The first part of the telescope arm may thus be connected to the rotary member, wherein the telescope arm is rotatably connected to the swing arm by means of the rotary member. Advantageously, the swing arm is swingable between a rest position permitting access for a an operator to the udder of said animal, and an application position permitting said rotation of the telescope arm to the second position of the arm arrangement.

According to a further embodiment of the invention, the device includes a removing member, which is arranged to retract said teacup from the teat of the animal and to move back the arm arrangement from the second position to the first position after completed milking. The removing member may include a pulling line, which is connected to the second part of the telescope arm and to a pulling member.

According to a further embodiment of the invention, the device includes a force-generating member, which, during milking, is arranged to generate a substantially uniform force acting on said teacup and having a substantial force component directed forwardly towards the head of the animal. Together with the weight of the milking member, which gives a downwardly directed force, a very favourable resulting force is obtained, which may act on the teats during milking and prevent constriction of the teat channel. The force-generating member may then include a cylinder including a piston which is displaceable in the cylinder through the supply or the discharge of a fluid. Advantageously, the first part of the telescope arm includes one of said cylinder and piston, wherein the second part of the telescope arm includes the other of said cylinder and piston.

According to a further embodiment of the invention, the device includes an activating member, which is arranged to initiate the application of said relatively low pressure to the milking member when the arm arrangement is moved from the first position towards the second position. Advantageously, the milking member includes a claw, which is connected to the conduit member, and four teatcups, which are connected to the claw via a respective short milk conduit.

The object is also obtained by the method initially defined, which includes the steps of: moving the arm arrangement from a first position, in which the milking member is located beside said animal, to a second position, in which the milking member is located below said animal, locking of the milking member in relation to the arm arrangement, and application of said teacup to said teat.

Advantageous, further developments of the method are defined in the dependent claims 18–22.

BRIEF DESCRIPTION OF THE DRAWINGS

The present invention is now to be explained more closely by means of various embodiments and with reference to the drawings attached.

DETAILED DESCRIPTION OF VARIOUS EMBODIMENTS OF THE INVENTION

FIGS. 1–4 disclose a device arranged to carrying a milking member 1. The milking member 1 includes a schematically disclosed claw 2 and four teatcups 3, see FIGS. 2–4. The teatcups 3 are connected to the claw 2 via a respective short milk conduit and a respective short pulse conduit (not disclosed). The milking member 1 thus has a conventional design known per se. Furthermore, the milking member 1 is in a conventional manner connected to a milking machine 5, which is disclosed schematically in FIGS. 1, 2 and 4 via a conduit member 6, which at least includes a long milk conduit and/or at least a long pulse conduit. The milking machine 5 includes a vacuum pump 7 and a milk collecting member 8.

The device according to the invention includes an arm arrangement 9 and a support element 10. The support element 10 is in the embodiment disclosed attached to a substantially vertical wall 11 in a milking parlour. In the milking parlour 12, the milker is present, the purpose of whose is to apply the teatcups 3 to the teats of the animal to be milked. The animal (not disclosed) is standing in a milking box 13, the ground 14 of which is indicated in FIGS. 1–4. In the embodiment disclosed, it is intended that the cow is standing with her rear part turned to the milking parlour 12 and thus having the head turned forwardly in the direction x from the milking parlour 12. The support element 10 is attached to the substantially vertical wall 11 by means of an attachment plate 15 and extends substantially horizontally outwardly from the wall 11. The support element 10 includes at its outer end a swing joint 16, which includes a swingable part 17 on which a swing arm 18 of the arm arrangement 9 is provided. The swing arm 18 is thus swingable in a substantially vertical plane in a rotary direction a, see FIG. 3. The swing arm 18 is partly formed by a spring element 19, which gives a limited elasticity to the swing arm 18. The swing arm 18 is swingable between at least a substantially vertical position, which is disclosed in FIGS. 1–4, and a rest position (not disclosed) in which the swing arm 18 has been swinged laterally so that it extends with an angle of inclination of about 10–50° in relation to a horizontal plane. In such a way, the arm arrangement 9 may be turned away in the rest position and the milker has free access for cleaning of the udder of the animal present in the milking box 13.

Furthermore, the arm arrangement 9 includes a rotary member 22, which is provided at the upper end of the swing arm 18. The rotary member 22 is connected to the swing arm 18 by means of a further rotary joint 23 permitting the rotation of the rotary member 22 in a rotary direction b about a rotary axis being substantially concentric with the swing arm 18.

Furthermore, the arm arrangement 9 includes a telescope arm 30, which is provided on the rotary member 22. The telescope arm 30 is rotatable in a rotary direction c between a first, substantially vertical position, see FIG. 1, and a second substantially horizontal position, see FIG. 2–4. It is to be noted that the second substantially horizontal position may incline upwards or downwards depending on the animal to be milked. The telescope arm 30 is rotatable by means of a mechanism of the rotary member 22. This mechanism is to be explained more closely below. The telescope arm 30 includes a first part 31 and a second part 32. The second part 32 is projectable out from and introduceable into the first part 31. The second part 32 thus functions as a piston in the first part 31 that functions as a cylinder. Between the first part 31 and second part 32 a space 33 is formed, which is sealed from the environment by means of a piston ring 34 that is fixedly connected to the second part 32 and a cylinder ring 35 that is fixedly connected to the first part 31. The telescope arm 30 is tubular and arranged to receive the conduit member 6 extending through the whole telescope arm 30. The conduit member 6 is fixedly connected to the second part 32 and more specifically in the forward end of the second part 32 by means of elastic clamping jaws 29 or any similar connecting member. The position of the milking member 1 in relation to the second part 32 of the telescope arm 30 is thus fixed and the milking member 1 is located at a small distance from the second part 32, which distance permits a certain movability of the milking member 1 in relation to the telescope arm 30 thanks to the flexibility of the conduit member 6 connecting the second part 32 and the milking member 1, see FIG. 2.

Thanks to the above described movabilities of the arm arrangement 9 a moving pattern according to the following is obtained. In a rest position of the device, the swing arm 18 is turned downwards to the rest position mentioned above. In this rest position, the telescope arm 30 extends in substantially the same direction as the swing arm 18. When the milking member 1 is to be applied, the milker grips two of the teatcups 3 and pull them upwardly so that the swing arm 18 takes the substantially vertical position. When this movement of the swing arm 18 is initiated also the vacuum application is activated, which is to be explained more closely below. At the same time or immediately after the achievement of the vertical position, the milker moves the two teatcups 3 forwardly, wherein the telescope arm 30 will be turned downwardly and the second part 32 of the telescope arm 30 is pulled outwardly to the substantially horizontal position disclosed in FIG. 2. By means of a small lifting of the teatcups 3 and the telescope arm 20, the arm arrangement 9 is locked in the position achieved, which is to be explained more closely below. Consequently, the teatcups 3 may in an easy manner be applied two and two to the teats of the animal without the need for the milker to hold the claw 2 proper.

Figure 6:
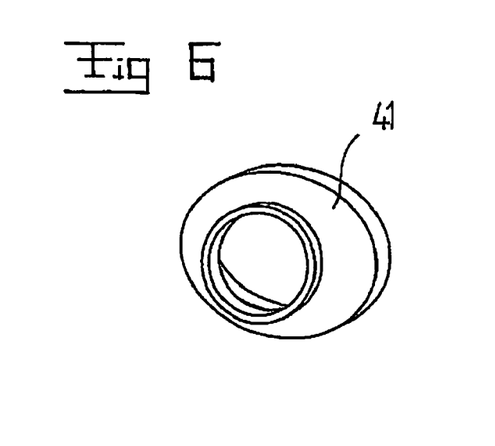
FIG. 6 discloses a perspective view of a first locking part of the device in FIGS. 1–4.
Figure 7:
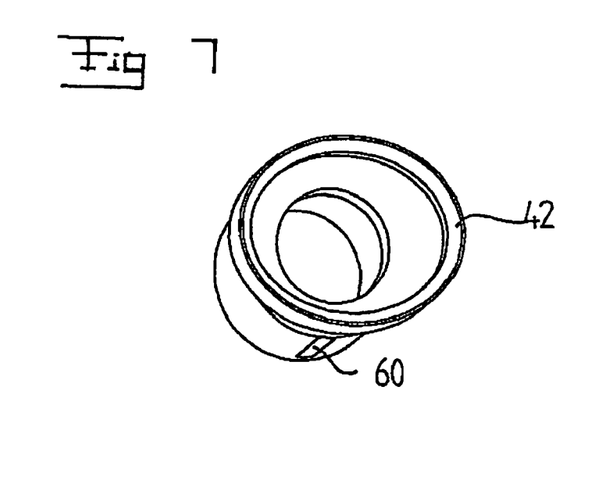
FIG. 7 discloses a perspective view of a second locking part of the device in FIGS. 1–4.
Figure 8:
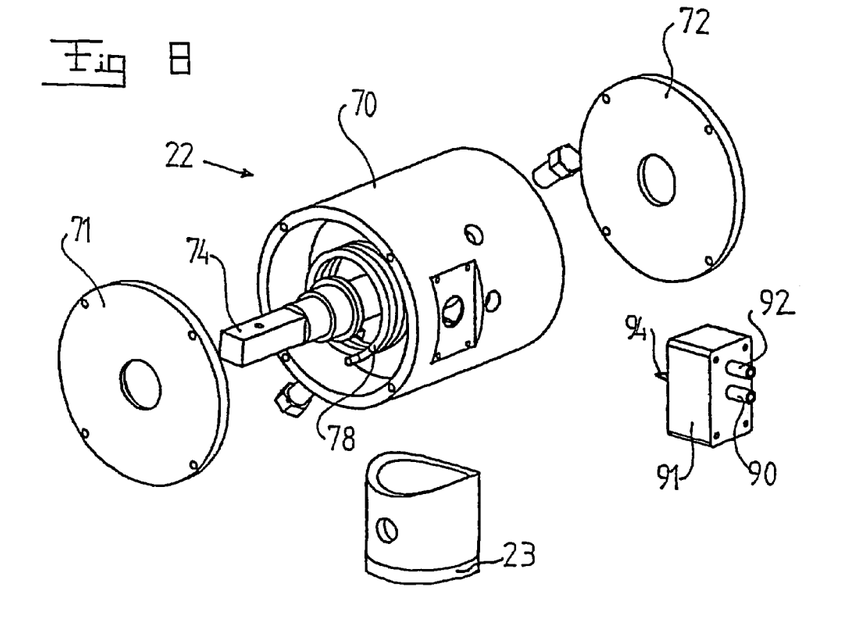
FIG. 8 discloses schematically a partly demounted rotary member of the device in FIGS. 1–4.
Figure 9:
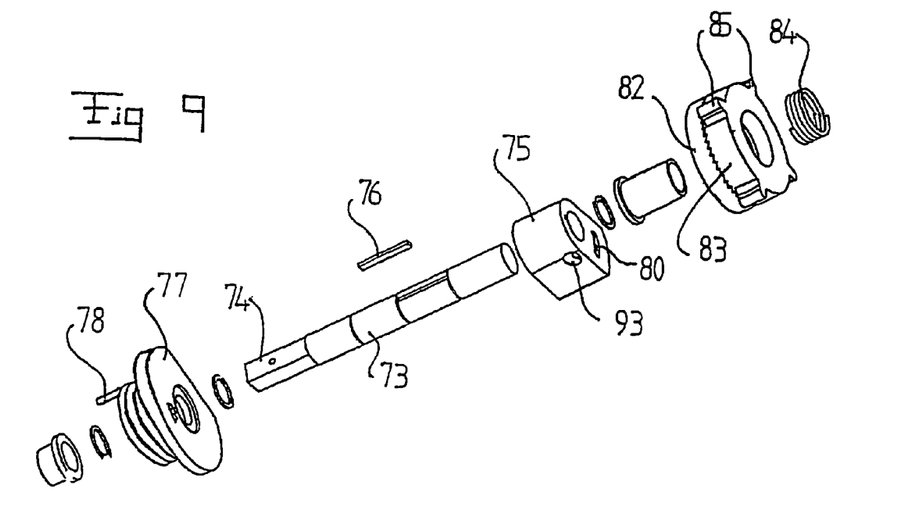
FIG. 9 discloses a perspective view of a number of components of the rotary member in FIG. 8.

The device also includes a first locking member including a first locking part 41, which is fixedly connected to the milking member 1, and a second locking part 42, which is displaceably provided on the projectable second part 32 of the telescope arm 30. The second locking part 42 is displaceable between a locking position (see FIG. 1) in which the second locking part 42 is in locking engagement with the first locking part 41, and thus locks and fixes the milking member 1 in relation to the telescope arm 30, and a releasing position (see FIG. 2), in which the second locking part 42 is not in engagement with the first locking part 41, wherein the milking member 1 is partly moveable in relation to the telescope arm thanks to the flexibility of the conduit member 6. The first locking part 41 is disclosed more closely in fig 6 and the second locking part 42 is disclosed more closely in FIG. 7.

Figure 5:
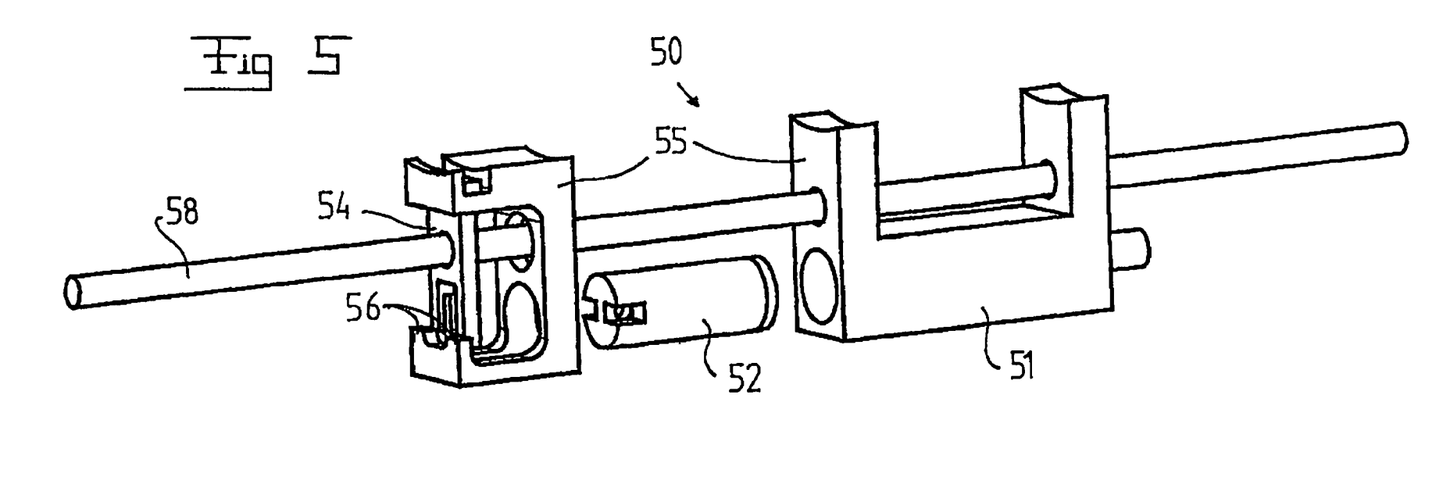
FIG. 5 discloses schematically an exploded view of a force-generating member of the device in FIGS. 1–4.

Furthermore, the arm arrangement 9 includes a second locking member 50, which is arranged to permit the projecting of the second part 32 of the telescope arm 30 out from the first part 31 and the locking of the second part 32 in relation to the first part 31 in an opposite movement direction. The second locking member 50 is disclosed in FIGS. 1, 2 and 5. The second locking member 50 includes a cylinder 51, which is fixedly provided on a first part 31 of the telescope arm 30, and a piston 52, which is moveably provided in the cylinder 51. The piston 52 is connected to a piston rod 53, which in turn is pivotably connected by a locking washer 54. The locking washer 54 is also pivotably connected to the first part 31 or, as is disclosed in FIG. 5, a housing 55 housing the cylinder 51 and substantially all components of the locking member 50. The locking washer 54 is biased in a direction forwardly to abutment against a stop shoulder 56 by means of a spring 57. The locking washer 54 includes an opening through which a rod 58 extends in a displaceable manner. The rod 58 is in its forward end via an attachment 59 fixedly connected to the second part 32 of the telescope arm 30. The attachment 59 extends through a longitudinal slot 60 in the second locking part 42. If the rod 58 is displaced forwardly, i.e. when the second part 32 moves outwardly from the first part 31, a forwardly directed force will be applied to the locking washer 54 in such a way that it comes to a position in which it does not prevent the continuing forwardly directed movement of the rod 58. By means of the cylinder 51 and the piston 52 the locking washer 54 may however be pulled rearwardly, wherein it by means of an inclined position will prevent the rod 58 from moving rearwardly and thus the introduction of the second part 32 into the first part 31. The cylinder 51 forms two cylinder spaces 61, 62, one on each side of the piston 52. These cylinders spaces 61, 62 are connected to a control unit 63 via a respective vacuum conduit 64, 65. The control unit 63 is arranged to apply a vacuum to one of said spaces 61, 62. The vacuum, or a relatively low pressure, is supplied by the vacuum pump being a component in the schematically disclosed milking machine 5. If a vacuum is supplied to the space 61 via the conduit 64 the locking washer 54 will thus be pulled rearwardly and lock the first part in the position achieved. If the vacuum is applied to the space 62 via the conduit 65, the locking washer 54 will be displaced forwardly towards the stop shoulder 56 and thus permit the second part 32 to move freely in relation to the first part 31.

The device also includes a sensor 66 of an electric or pneumatic type, which is provided on the second part 32. The sensor 66 is arranged to detect when the second locking part 42 is pulled rearwardly and thereby initiate the milking state of the device by delivering a signal to the control unit 63, which then applies a vacuum to the space 62, which releases the second part 32, and to the space 33, via a conduit 67, which creates a forwardly directed force acting on the milking member 1 during the milking. Furthermore, the control unit 63 will interrupt the vacuum supply to the rotary member 22, which is to be described more closely below. The telescope arm 30 thus functions during the milking as a force-generating member exerting a forwardly directed force in the direction x to the milking member 1 and the teatcups 3.

Furthermore, the arm arrangement 9 includes a third locking member, which is comprised by the rotary member 22 and which is arranged to enable locking of the telescope arm 30 in a reached rotary position. This locking is achieved by the rotation of the telescope arm 30 in a second rotary direction c', which is opposite to the first rotary direction c. The function of this locking appears from the following description of the rotary member 22, see FIGS. 8–12. The rotary member 22 includes a housing 70 with two end pieces 71 and 72, which are fixedly provided on the housing 70. A shaft 73 extends through the housing 70 and an opening in the respective end piece 71, 72. The shaft 73 includes a pin 74, which is fixedly connected to the telescope arm 30 in such a way that the telescope arm 30 is not rotatable in relation to the shaft 73. A piston housing 75 is fixedly provided on the shaft 73 by means of a locking wedge 76. A cam-disc 77 is fixedly provided on the piston housing 75 and thus also the cam-disc 77 is fixed in relation to the shaft 73. A torsion spring 78 is with a first end attached to the end piece 71 and with a second end to the cam-disc 77.

Figure 1:
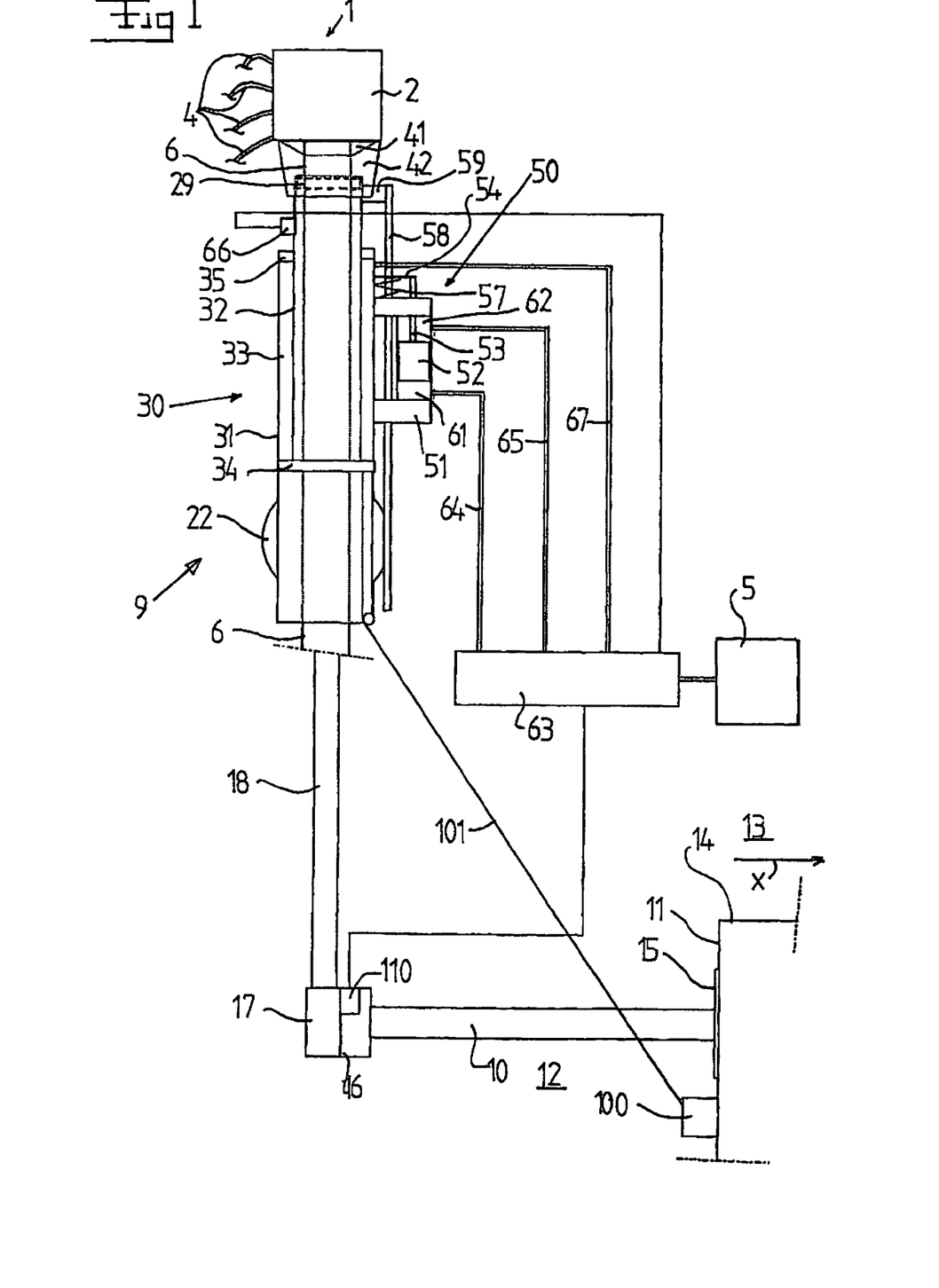
FIG. 1 discloses schematically a sideview of a device according to the invention in a first position.
Figure 2:
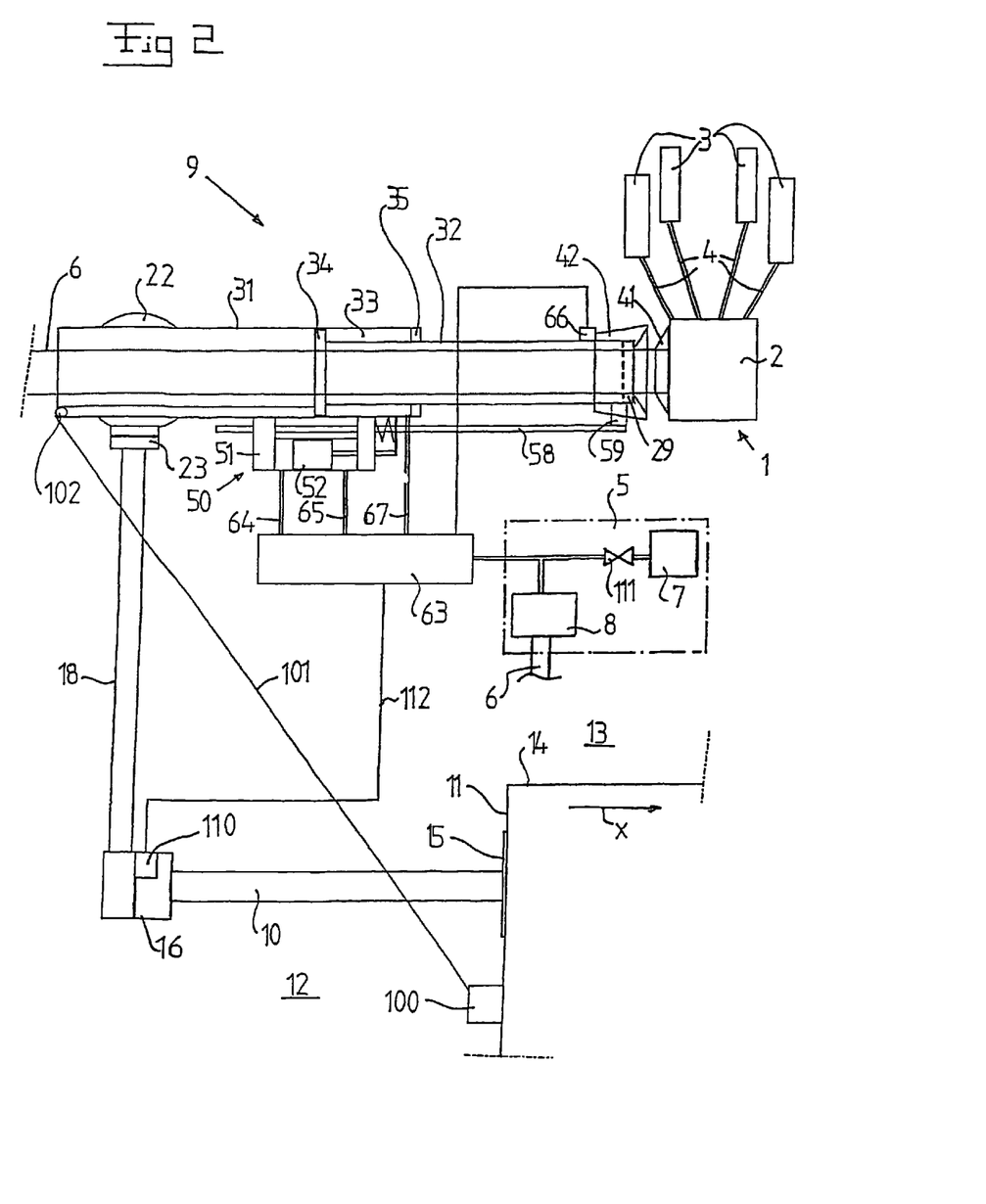
FIG. 2 discloses schematically a sideview of a device in FIG. 1 in a second position.
Figure 3:
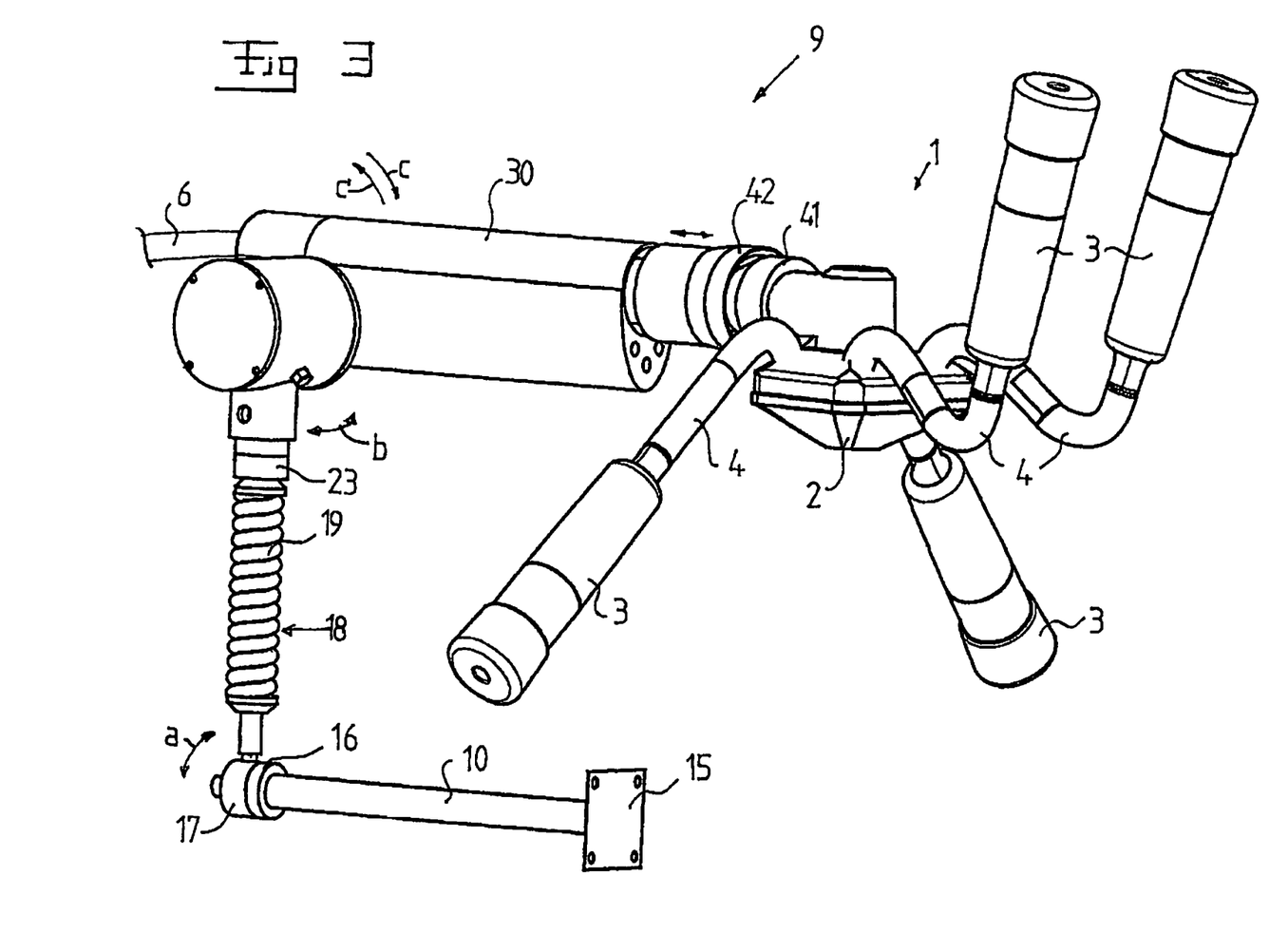
FIG. 3 discloses a perspective view of an embodiment of a device according to the invention.
Figure 4:
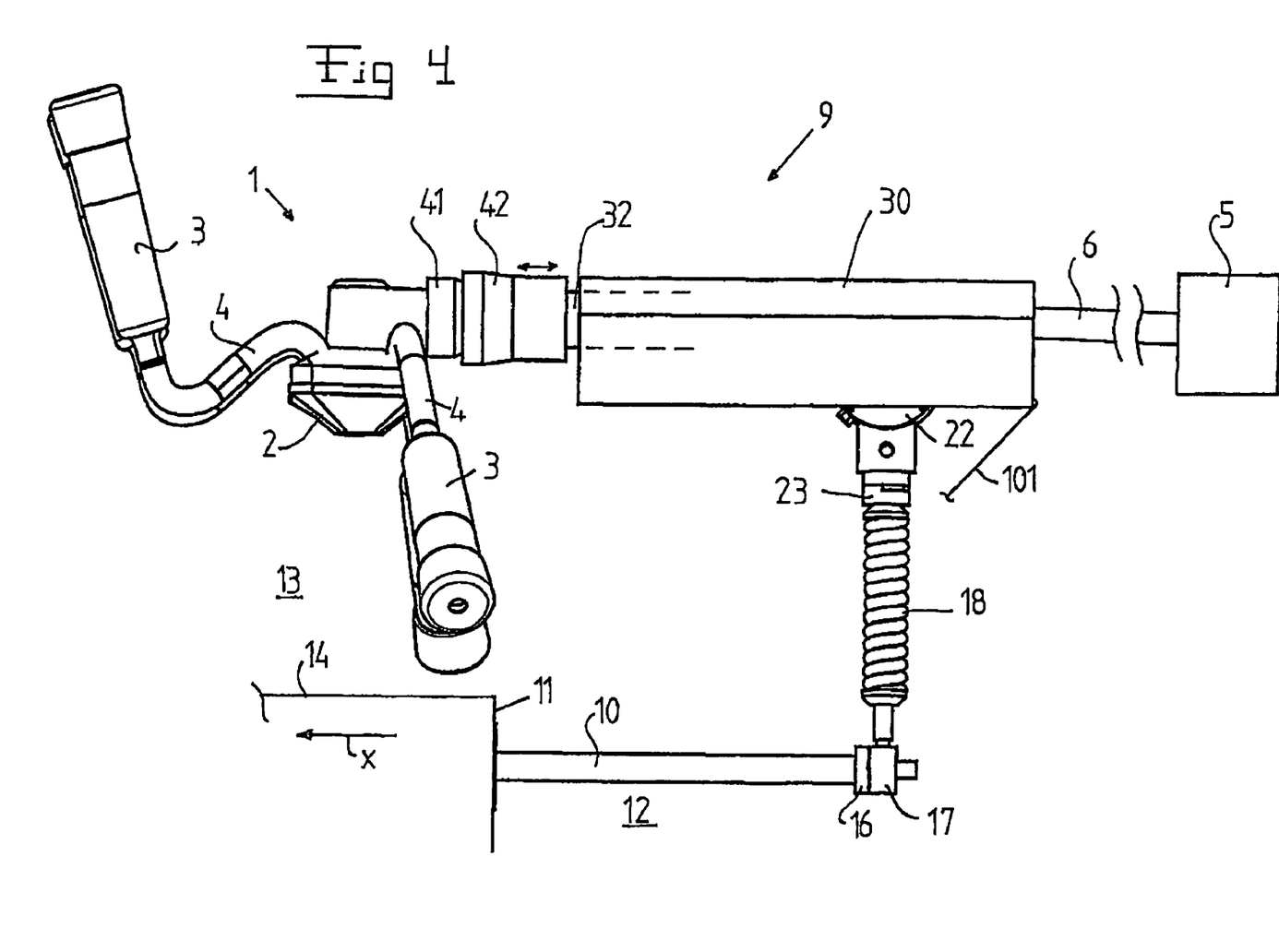
FIG. 4 discloses a sideview of the device in FIG. 3.

The torsion spring 78 is designed in such way that it exerts a lifting force to the telescope arm 30 in the position disclosed in FIG. 2. This lifting force of the torsion spring 78 will thus function as a balancing member in the position disclosed in FIG. 2. It is to be noted that the torsion spring 78 exerts a force which only corresponds to the weight of the arm 30 and the conduit member 6, and thus not the weight of the milking member 1 and the teatcups 3.

Figure 10:
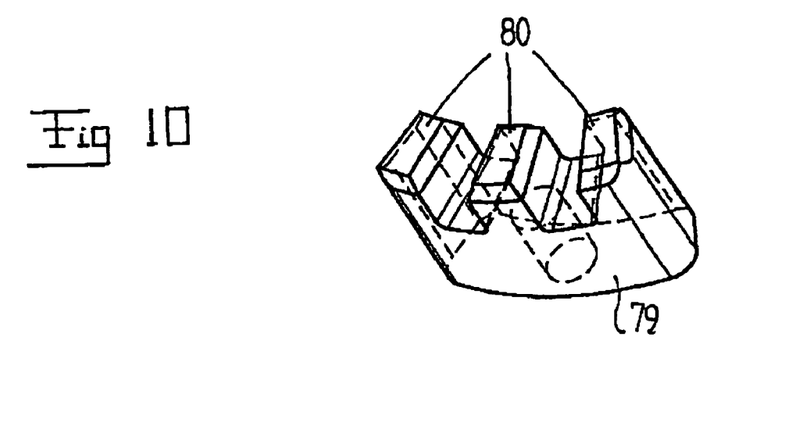
FIG. 10 discloses a perspective view of a piston of the rotary member in FIG. 8.
Figure 11:
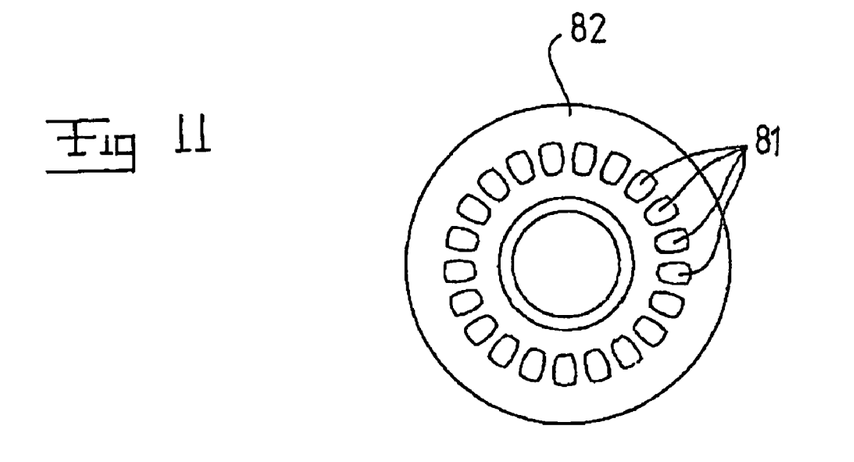
FIG. 11 discloses a view of a tooth washer of the rotary member in FIG. 8.
Figure 12:
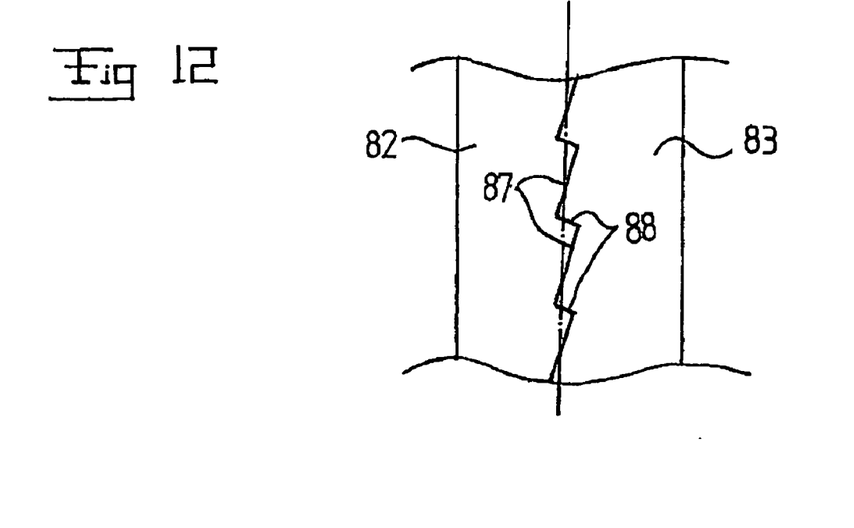
FIG. 12 discloses a view of a part of two tooth washers of the rotary member in FIG. 8.

The piston housing 75 includes a piston 79, see FIG. 10, which is projectable out from the piston housing 75. The piston 79 includes one or several projections 80, for example in the embodiment disclosed three projections 80, which are arranged to engage three openings 81 of a first tooth washer 82, are shown as seen in FIG. 11. The first tooth washer 82 is rotatably provided on the shaft 73 and when the piston 79 is displaced out from the piston housing 75, the first tooth washer 82 is arranged to co-operate with a second tooth washer 83, which is provided in the housing 70 in such a way that it is displaceable in the longitudinal direction of the shaft 73 against the action of a compression spring 84, but not rotatable in relation to the housing 70 thanks to four projections 85 which are in engagement with grooves (not disclosed) of the inner wall of the housing 70. The tooth washers 82 and 83 include a respective tooth ring with first flanks 87 with a relatively steep inclination, see FIG. 12. When the piston 79 is in projected position and thus in engagement with the first tooth washer 82, the rotary axis 73, and thus the telescope arm 30, will be relatively fixed in relation to the rotary member 22 and the swing arm 18. Thanks to the relatively plane flanks 87, the rotary shaft 73 and the telescope arm 30 may be rotated upwards by overcoming a relatively small force. It is also possible to rotate the telescope arm 30 and the shaft 73 downwards by overcoming a relatively large force thanks to the inclined, relatively steep flanks 88.

The position of the piston 79 in the piston housing 75 is controlled by means of the application of a vacuum via the control unit 63. The piston housing 75 is connected to the control unit 63 (see FIG. 1) via a vacuum conduit 90, which is connected to a shut-off valve 91. From the shut-off valve 91 a vacuum conduit 92 extends further to a connection 93 of the piston housing 75. The shut-off valve 91 includes a manoeuvring pin 94 the position of which is controlled by the cam-disc 77. When the telescope arm 30 is rotated downwards, the manoeuvring pin 94 will abut the peripheral surface of the cam-disc 77 and by means of friction be maintained in an upwardly directed position, wherein the shut-off valve 91 is closed and no vacuum is applied to the piston housing 75. During this movement, the piston 79 is pulled into the piston housing 75, and the telescope arm 30 and the shaft 73 are thus freely rotatable in relation to the rotary member 22. When the desired position of the telescope arm 30 has been reached, the telescope arm 30 is somewhat lifted, wherein the manoeuvring pin 94 is rotated downwards and opens the shut-off valve 91, wherein vacuum is applied to the piston housing 75. Consequently, the piston 79 will be projected outwardly against the action of a compression spring (not disclosed) and engage the tooth washer 82, wherein the telescope arm 30 is locked in the rotary position achieved. A relative locking or fixing of the telescope arm 30 in this rotary position is thus achieved. As mentioned above, it is however thanks to the flanks 87, 88 possible to rotate the telescope arm 30 by applying a small and large rotary force, respectively. When the locked rotary position is to be released, the supply of the relatively low pressure is interrupted by means of the control unit 63, wherein the compression spring mentioned above retracts the piston 79 out of engagement with the tooth washer 82.

Furthermore, the device includes a removing member 100 with a rotary motor of a pneumatic, hydraulic or electric type. The drive motor of the removing member 100 is connected to a pulling line 101, which extends via a guide 102 into the telescope arm 30 and is connected to the projectable second part 32. Removal of the milking member 1 is initiated in a conventional manner via the control unit 63 when the milking is to be finished. The drive motor of the removing member 100 will thus pull the pulling line 101 and the second part 32 rearwardly, wherein the teatcups 3 are pulled off from the teats of the animal. At the same time the vacuum application to the cylinder 51 and the piston housing 75 is deactivated, via the control unit 63, in such a way that the arm arrangement 9 will be freely moveable. When the second part 32 has been pulled into the first part 31, the telescope arm 30 is rotated upwardly by means of a continuing pulling in the pulling line 101, and the swing arm 18 is swinged downwardly and laterally. This moving pattern may be obtained by means of a suitable location of the drive motor of the removing member 100.

The device also includes an activating device with a sensing member 110 (see FIG. 1), which in the embodiment disclosed is provided at the swing joint 16. When the swing arm 18 is swinged in relation to the support element 10, the sensing member 110 will activate the control unit 63 by a signal, wherein the control unit 63 initiates the vacuum application to the various components of the device and the the milking member 1 and the teatcups 3. This obtained by opening of a schematically disclosed closing valve 111 of the milking machine 5. The sensing member 110 is arranged to be activated as soon as the swinging of the swing arm 18 from the downwardly turned rest position is initiated. The sensing member 110 may of course be located in many different positions and in many different manners of the device, for instance at the rotary member 22, the rotary joint 23 and/or the telescope arm 30. The sensing member 110 may include a mechanical element, which is brought to a movement when the swing arm 18 is swinged, or include optical, inductive or any similar members for sensing a movement of the swing arm 18. The sensing member 110 is connected to the control unit 63 via a connecting member 112 of electric, pneumatic, hydraulic or mechanical type.

The invention is not limited to the embodiments disclosed but may be varied and modified within the scope of the following claims.

The embodiments disclosed refers to an arm arrangement which is intended to be introduced between the rear legs of the animal to be milked. However, it is to be noted that the invention also may be applied to arm arrangements intended to be introduced from the side of the animal to be milked.

The invention claimed is:

1. A device for carrying a milking member, which includes at least a teatcup and which, via a flexible conduit member, is connectable to a milking machine arranged to provide a relatively low pressure, wherein the device includes:
a support element, which is fixedly mounted to or at a milking box arranged to receive an animal to be milked; and
an arm arrangement which is pivotably connected to the support element and arranged to support the milking member at least in connection with the application of said teatcup to a teat of the animal, wherein the arm arrangement is moveable from a first position in which the milking member is located beside the animal, to a second position, in which the milking member is located below the animal,
wherein the device includes means for locking the milking member, which are arranged to permit locking of the milking member in relation to the arm arrangement in order to facilitate the application of said teatcup to the teat, and
wherein the device includes means for locking of the arm arrangement, which are arranged to permit locking of the arm arrangement in relation to the support element in the second position, and
further comprising means for releasing of the means for locking the milking member arranged to permit releasing of the locking of the milking member in relation to the arm arrangement after the application of the teatcup, wherein the milking member is partly moveable in relation to the arm arrangement and wherein the milking member is connected to the arm arrangement via the conduit member which is fixedly connected to the arm arrangement.

2. A device according to claim 1, wherein the device includes means for releasing of the means for locking of the arm arrangement arranged to permit releasing of said means for locking of the arm arrangement and the conduit member during milking.

3. A device according to claim 1, wherein at least when the movement of the arm arrangement from the first position to the second position is initiated, said means for locking the milking member is arranged to permit locking of the milking member in relation to the arm arrangement.

4. A device according to claim 1, wherein the arm arrangement includes an arm element which is fixedly connected to the conduit member in the proximity of the milking member.

5. A device according to claim 4, wherein the arm element includes a telescope arm with at least a first part and a second part, which second part is displaceable in relation to the first part and which is fixedly connected to the conduit member in the proximity of the milking member.

6. A device according to claim 5, wherein said means for locking the milking member includes a first locking member, which includes a first locking part fixedly connected to the milking member and a second locking part displaceably provided on the projectable second part of the telescope arm between a locking position, in which the second locking part is in engagement with the first locking part and locks the milking member in relation to the arm arrangement, and a releasing position, in which the second locking part is not in engagement with the first locking part, wherein the milking member is partly moveable in relation to the arm arrangement.

7. A device according to claim 6, wherein said means for locking the milking member includes a second locking member which is arranged to permit the second part to project during the movement of the arm arrangement from the first position to the second position and to lock the second part in relation to the first part in an opposite movement direction.

8. A device according to claim 5, wherein the device includes a removing member which is arranged to retract said teatcup from the teat of the animal and to move back the arm arrangement from the second position to the first position after milking of the animal is completed, and wherein the removing member includes a pulling line which is connected to the second part of the telescope arm and to a pulling member.

9. A device according to claim 4, wherein the arm element is tubular and that the conduit member extends through the arm element.

10. A device according to claim 4, wherein the arm arrangement includes a rotary member which is connected to the arm element and arranged to permit rotation of the arm element in a first rotary direction about a rotary axis of the rotary member during the movement of the arm arrangement from the first position to the second position.

11. A device according to claim 10, wherein said means for locking the milking member includes a third locking member, which is comprised by the rotary member and arranged to provide said locking of the arm element in a rotary position obtained through a rotation of the arm element in a second rotary direction which is opposite to the first rotary direction.

12. A device according to claim 10, wherein the arm arrangement includes a swing arm, which is swingably connected to the support element by means of a swing joint, wherein the arm element is rotatably connected to the swing arm.

13. A device according to claim 12, wherein the arm element includes a telescope arm with at least a first part and a second part and wherein the first part of the telescope arm is connected to the rotary member, and wherein the telescope arm is rotatably connected to the swing arm by the rotary member.

14. A device according to claim 13, wherein the swing arm is swingable between a rest position permitting access for an operator to the udder of the animal, and an application position permitting said rotation of the telescope arm to the second position of the arm arrangement.

15. A device according to claim 1, wherein the device includes a removing member which is arranged to retract said teatcup from the teat of the animal and to move back the arm arrangement from the second position to the first position after milking of the animal is completed.

16. A device according to claim 1, wherein the device includes an activating member which is arranged to initiate the application of said relatively low pressure to the milking member when the arm arrangement is moved from the first position towards the second position.

17. A method for carrying a milking member, which milking member includes at least one teatcup which is connectable to a milking machine via a flexible conduit member, by means of a device which includes a support element, which support element is fixedly mounted to or at a milking box arranged to receive an animal to be milked, and wherein the device further includes an arm arrangement which is pivotably connected to the support element and arranged to support the milking member at least in connection with the applying of said teatcup to a teat of said animal, wherein the method includes the steps of:
  moving the arm arrangement from a first position, in which the milking member is located beside said animal, to a second position, in which the milking member is located below said animal;
  locking the milking member in relation to the arm arrangement;
  application of said teatcup to said teat;
  locking of the arm arrangement in relation to the support element in the second position; and
  releasing of the locking of the arm arrangement after the application of said teatcup, wherein the arm arrangement is balanced with respect to the weight of the arm arrangement and the conduit member.

18. A method according to claim 17, including the further step of:
  releasing of the locking of the milking member in relation to the arm arrangement after the application of said teatcup, wherein the milking member is partly moveable in relation to the arm arrangement.

19. A method according to claim 17, including the further step of:
  initiating said locking of the milking member in relation to the arm arrangement before the movement of the arm arrangement from the first position to the second position.

20. A method according to claim 17, wherein the arm arrangement includes a projectable telescope arm which carries the milking member and which is rotatably provided on a swing arm that is swingably provided on the support element, wherein the method includes the further steps of:
  swinging of the swing arm from a rest position, which permits access for an operator to the udder of said animal, to an application position; and
  rotating and projecting of the telescope arm to the second position of the arm arrangement.

21. A method according to claim 17, wherein the milking member includes a claw and four teatcups and wherein the method includes the further steps of:
  gripping two teatcups of the milking member when it is located in the first position; and
moving the two teatcups while maintaining said gripping from the first position to the second position.

22. A method according to claim 21, wherein said application step includes:
  application of the two gripped teatcups to respective teats of the animal; and
  gripping of the two remaining teatcups and application of the two remaining teatcups to respective teats of the animal.

* * * * *